United States Patent [19]
Simmons et al.

[11] Patent Number: 5,742,452
[45] Date of Patent: Apr. 21, 1998

[54] LOW MASS MAGNETIC RECORDING HEAD AND SUSPENSION

[75] Inventors: Randall G. Simmons; Joseph J. Fatula, Jr., both of San Jose, Calif.

[73] Assignee: International Business Machines Corporation, Armonk, N.Y.

[21] Appl. No.: 599,401

[22] Filed: Jan. 10, 1996

[51] Int. Cl.⁶ .............................. G11B 5/596; G11B 5/31
[52] U.S. Cl. ........................................... 360/104; 360/126
[58] Field of Search ...................................... 360/104, 126

[56] References Cited

U.S. PATENT DOCUMENTS

| | | | |
|---|---|---|---|
| 4,418,472 | 12/1983 | Lorenze, Jr. ............................. | 29/603 |
| 4,837,924 | 6/1989 | Lazzari ..................................... | 29/603 |
| 4,949,207 | 8/1990 | Lazzari ..................................... | 360/119 |
| 5,163,218 | 11/1992 | Hamilton .................................. | 29/603 |
| 5,228,184 | 7/1993 | Kishi ........................................ | 29/603 |
| 5,274,520 | 12/1993 | Matsuzono et al. .................... | 360/113 |
| 5,408,373 | 4/1995 | Bajorek et al. .......................... | 360/104 |

*Primary Examiner*—Robert S. Tupper
*Attorney, Agent, or Firm*—Merchant, Gould, Smith, Edell, Welter & Schmidt, P.A.

[57] ABSTRACT

A integral magnetic head and suspension and method for making the same. The integral head and suspension are fabricated completely on silicon (Si) wafers using semiconductor processes. A N+ silicon layer is disposed over a P-silicon wafer. The N+ silicon layer and the P-silicon wafer are thermally oxidized to generate a bottom silicon oxide layer opposite the N+ layer side of the wafer and a top silicon oxide layer on the N+ side of the wafer, and to drive the N+ silicon into the P- silicon wafer. A layer of polysilicon is disposed over the silicon oxide layer on top of the N+ silicon layer and is then patterned to define the head structure and suspension structure as one piece. Then, a magnetic head is disposed on the polysilicon. Finally, the magnetic head and suspension are separated from the wafer by removing the first silicon oxide layer by a chemical etchant and the P- silicon wafer by selective etching. The head and suspension are released from the silicon wafer as a single structure using the above-described semiconductor processes. Accordingly, no grinding or cutting is used to define the dimensions of the head. Further, no processes are required to attach the head to the suspension and the suspension can be made from low mass materials such as silicon (Si) or $Al_2O_3$.

55 Claims, 11 Drawing Sheets

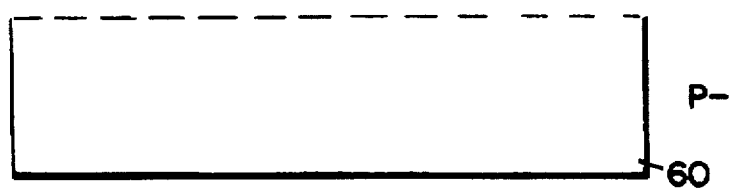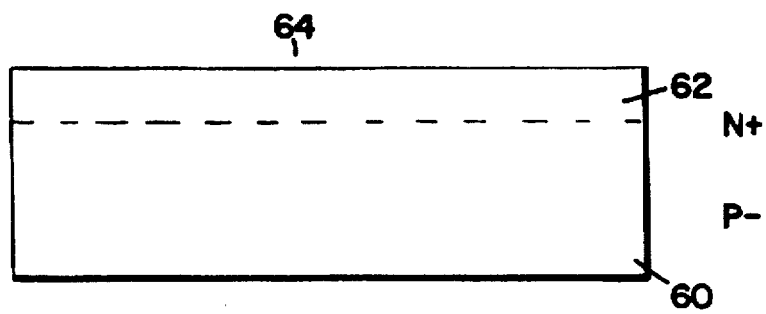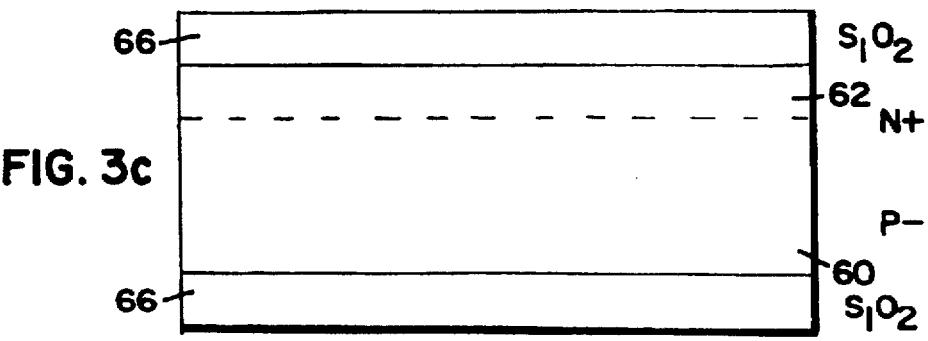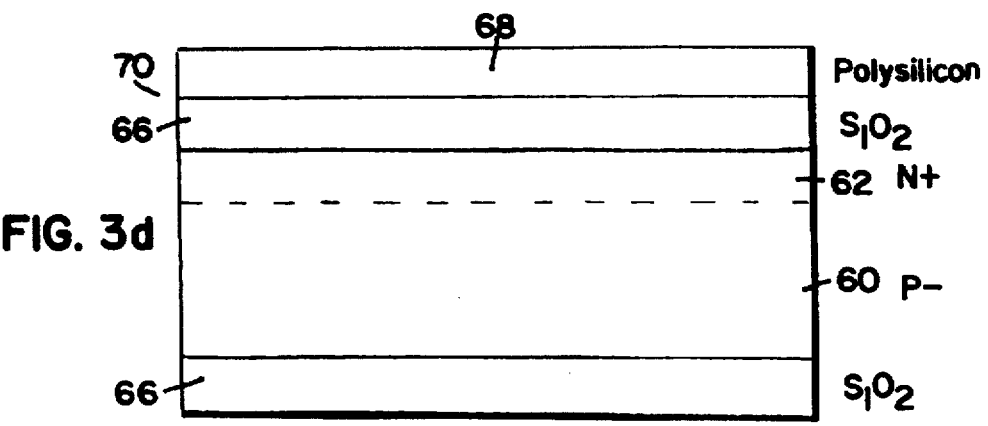

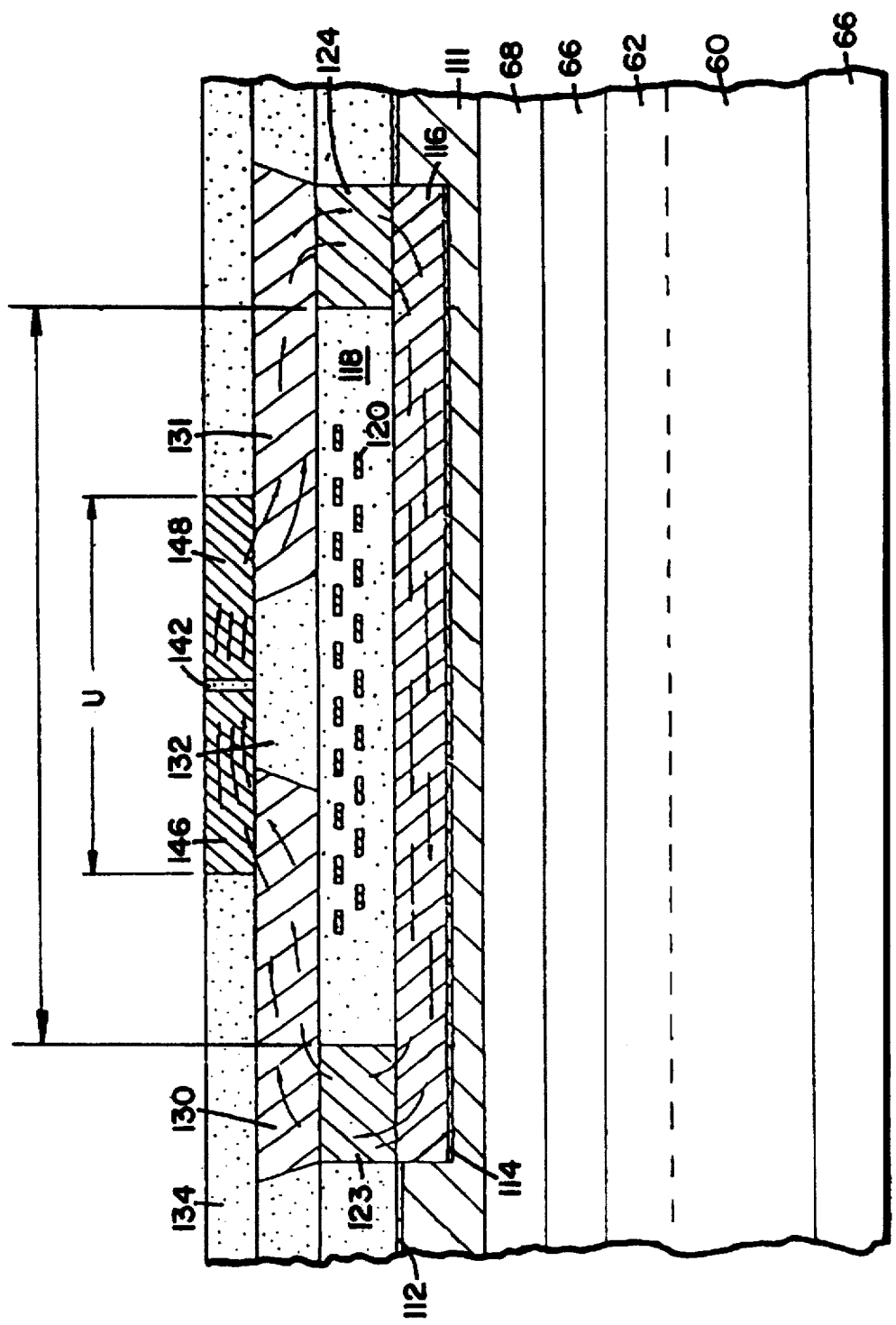

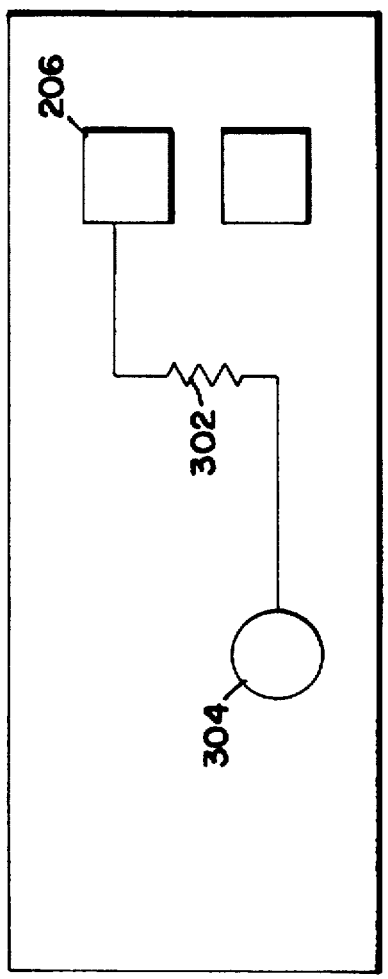

LOW MASS MAGNETIC RECORDING HEAD AND SUSPENSION

BACKGROUND OF THE INVENTION

1. Field of the Invention

This invention relates in general to integral recording heads and suspensions, and more particularly, to a low mass magnetic head and suspension fabricated as one single structure using semiconductor processes and a method for making the same.

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

The development of thin film magnetic head arrays has become the subject of increased interest, especially in the area of high speed, high density recording and retrieval of digital computer information on magnetic media.

Thin film magnetic heads are manufactured in a manner similar to a semiconductor integrated circuit elements, by film forming techniques such as vapor deposition, sputtering or the like or lithography such as photoengraving processes, etching, etc. These methods are advantageous in producing high-accuracy heads in large quantities.

There are two types of thin film magnetic heads hitherto known, i.e. a vertical head wherein a magnetic gap is formed in a direction perpendicular to a substrate surface (film thickness direction) and a horizontal head wherein a magnetic gap is formed along the substrate surface.

The vertical head is put to practical use because in the process of making vertical heads, it is easy to form a gap and vertical heads exhibit resistance against the sliding movement of a medium. On the other hand, the horizontal head makes it possible to complete whole processes, such as air bearing surface processing, in a substrate, since the surface of the head normally oriented to the medium is on the substrate side. Moreover, the depth of the magnetic gap is determined by the thickness of the film in the horizontal head, so that the depth of the gap is easily controlled during manufacture.

Horizontal thin film magnetic heads have become an object of attention owing to their advantages in dealing with narrow tracks with the recent progressive increase in magnetic recording density. Further, the performance of magnetic recording systems improves rapidly as the separation between the read/write head and the associated recording medium decreases. In rigid media systems, today, this separation is referred to as "flying height"—a reference relating to the fact that the conventional head, often referred to as a slider, is supported above the relatively moving medium surface by an air bearing.

Known methods for fabricating thin film magnetic head arrays typically consist of sequentially depositing thin film layers of magnetic, conductive, and insulative materials. The magnetic thin film layers (usually permalloy) form the magnetic yoke of the head structure and serve the function of concentrating magnetic flux according to desired geometries. The conductor thin film layer, typically gold or copper, forms the "turns" or windings around the magnetic yoke of the individual heads which induce a magnetic field when current is passed through them. The delineated layer of conductive thin films also provides electrical interconnection between the coil section of the heads and the power supply/addressing network which is used to activate the array. Finally, insulator thin film layers (polyimides, $SiO_2$) are used to electrically isolate the various thin film conductor layers (especially in multi-turn head designs), as well as to provide precise gap spacing between upper and lower layers of the magnetic yoke.

The various thin film layers are typically deposited by a variety of techniques including vacuum deposition (sputtering, evaporation), electroplating, and spin-coating (e.g., for spin-on insulator materials). The resultant multilayer thin film array structure is fabricated on a rigid substrate. For example, conventional magnetic heads are produced using ceramic wafers such as AlTiC and are suspended on stainless fixtures using physical or mechanical methods. The thin film layers are delineated into patterns (as required) using photolithographic masking and wet chemical or plasma etching techniques. The size and mass of the head are determined by the dimensions and composition of the wafer, respectively. The size is also limited by the physical and mechanical cutting methods used to cut the head from the wafer. More specifically, the length of the head is limited by the thickness of the wafer and the width and height of the head are limited by the physical cutting methods and tolerances.

Furthermore, conventional heads also require attachment to the suspensions and the wires for electrical contact must be bonded to the head assembly. These processes increase the size of the head/suspension assembly as well as contribute significantly to the cost.

It can be seen then that there is a need for a low mass magnetic head and suspension fabricated as one single structure using semiconductor processes.

It can also be seen that there is a need for an integral magnetic head and suspension with substantially reduced size and mass and a method for making the same.

It can also be seen that there is a need for a process for manufacturing an integral magnetic head and suspension that eliminates all head attach processes and alignment problems.

SUMMARY OF THE INVENTION

To overcome the limitations in the prior art described above, and to overcome other limitations that will become apparent upon reading and understanding the present specification, the present invention discloses a low mass magnetic head and suspension and method for making the same.

The present invention solves the above-described problems by providing a low mass magnetic head and suspension which are fabricated completely on silicon (Si) wafers using semiconductor processes. The head and suspension are released from the silicon wafer as a single structure using semiconductor processes. No grinding or cutting is used to define the dimensions of the head. No processes are required to attach the head to the suspension. The suspension can be made from low mass materials such as silicon (Si) or $Al_2O_3$.

A system in accordance with the principles of the present invention comprises a P- silicon wafer having a N+ silicon layer disposed over the P- silicon wafer. The N+ silicon layer and the P- silicon wafer are thermally oxidized to generate a first silicon layer opposite the N+ layer side of the wafer and a second silicon oxide layer on the N+ side of the wafer, and to drive the N+ silicon into the P- silicon wafer. A layer of polysilicon may be disposed over the silicon oxide layer on top of the N+ silicon layer using, for example, a highly conductive media such as silicide. The polysilicon is then patterned to define the head structure and suspension structure as one piece with the magnetic head being disposed on the polysilicon. Finally, the magnetic head and suspension are separated from the wafer by removing the first silicon oxide layer by a chemical etchant and the P- silicon wafer by selective etching.

One aspect of the present invention is that a low mass magnetic head and suspension are fabricated as one single structure using semiconductor processes thereby eliminating the head-attachment process.

Another aspect of the present invention is that an integral magnetic head and suspension is fabricated with substantially reduced size and mass.

Another aspect of the present invention is that a process for manufacturing an integral magnetic head and suspension that eliminates all head attach processes and alignment problems is provided.

Another aspect of the present invention is that the head and suspensions are reduced in size since mechanical processes are eliminated, and leads which are defined by microlithographic techniques permit reduced size, optimal performance and multiple lead capability.

Yet another aspect of the present invention is that the suspension is conductive thereby able to be grounded.

Still another aspect of the present invention is that a shunt resistor is provided for electrostatic discharge (ESD) protection.

Another aspect of the present invention is that the integral head and suspension exhibit increased reliability since chipping and cracking from the cutting process are eliminated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIGS. 3a–d illustrate the suspension forming process steps for an integral head and suspension according to the present invention;

FIG. 5 illustrates one embodiment of a complete head and suspension obtain by the processed discussed above with reference to FIGS. 3 and 4.

FIG. 9 illustrates the formation of an ESD barrier between the leads of the integral head and suspension according to the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a low mass magnetic head and suspension which are fabricated completely on silicon (Si) wafers using semiconductor processes. The head and suspension are released from the silicon wafer as a single structure using semiconductor processes. No grinding or cutting is used to define the dimensions of the head. No processes are required to attach the head to the suspension. The suspension can be made from low mass materials such as silicon (Si) or $Al_2O_3$.

Figure 1:
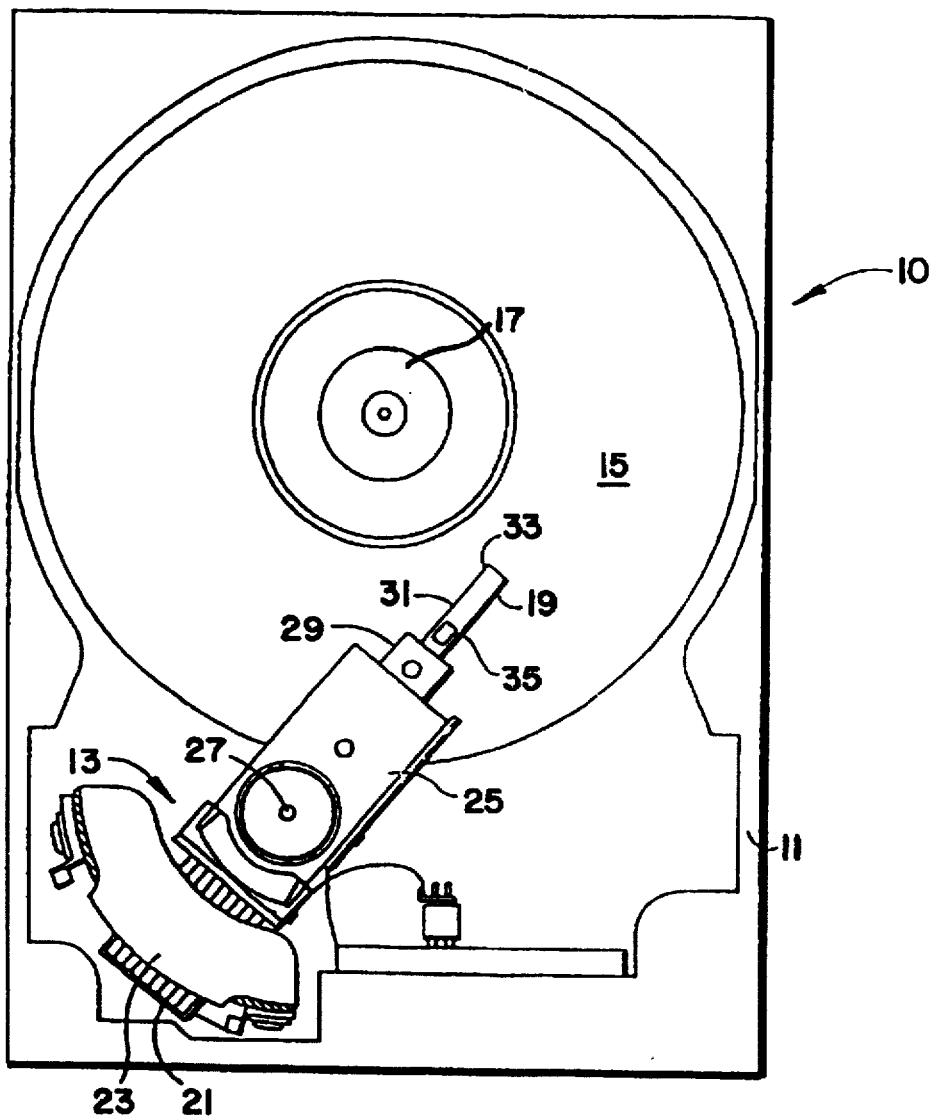
FIG. 1 illustrates a magnetic storage system according to the present invention.

FIG. 1 illustrates a magnetic storage system 10 including a housing 11 in which is mounted a rotary actuator 13, one or more associated magnetic storage disks 15 mounted on a spindle 17 and a drive means (not shown) coupled to a spindle 17 for rotating the disk 15. The rotary actuator 13 moves an integrated transducer/suspension assembly 19 in accordance with the present invention in an arcuate path across the surface of the storage disk 15. The rotary actuator 13 includes a voice coil motor comprising a coil 21 movable within the magnetic field of a fixed permanent magnetic assembly 23. An actuator arm 25 having the moving coil 21 formed on one end thereof is pivotably mounted on pivot post 27. A support arm 29 is attached to the other end of the actuator arm 25 and projects across the surface of the disk 15. The support arm 29 supports the integrated transducer/slider/suspension assembly 19 produced according to the procedure set forth herein in cantilever fashion over the surface of the disk 15.

Figure 2:
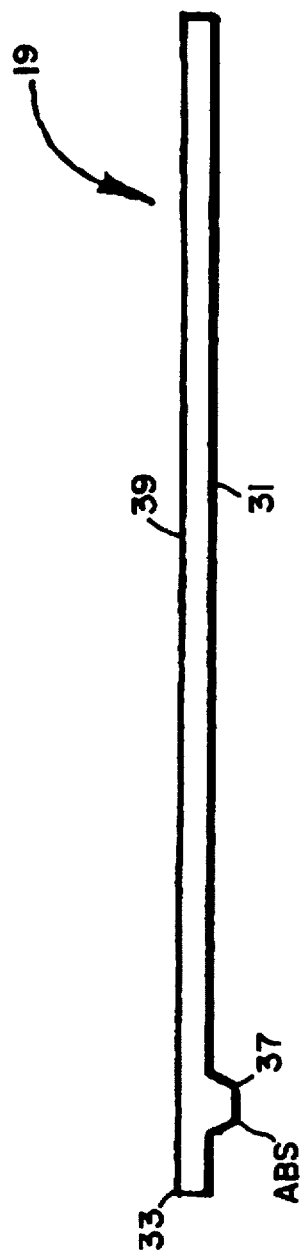
FIG. 2 illustrates an integrated assembly that includes a suspension section and a transducer/slider formed at one end integral with the suspension section.

FIG. 2 illustrates an integrated assembly 19 that includes a suspension section 31 and a transducer/slider 33 formed at one end integral with the suspension section 31. The suspension section 31 supports the transducer/slider 33 above the surface of the disk 15 on a bearing or cushion of air generated by the rotation of the disk 15.

Now referring to FIGS. 3a–d, the process for producing an integral head and suspension according to the present invention is explained. FIG. 3a illustrates a P- silicon wafer 60. The P- silicon wafer 60 is doped with N+ 62 by ion implantation or out-diffusion of a doped glass as illustrated in FIG. 3b, thereby resulting in a doped silicon wafer 64. The doped silicon wafer 64 is then thermally oxidized to generate a silicon oxide layer 66 on both sides of the wafer 64 and to drive N+ dopant 62 into the wafer to the desired thickness of the suspension. Alternatively, the wafer 64 may be annealed after oxidation. The resulting oxidized structure 66 is shown in FIG. 3c.

Polysilicon, doped polysilicon or a silicide layer 68 of about 1 um thickness is deposited over the silicon oxide layer 66 using low pressure chemical vapor deposition (LPCVD), chemical vapor deposition (CVD) or other similar semiconductor deposition processes. For clarity, only the term polysilicon will be used herein. However, those skilled in the art will recognize that doped polysilicon or a silicide layer could be substituted wherever the term polysilicon is used. The polysilicon 68 is patterned using photoresist and a chemical etchant or reactive ion etching to define head structure and suspension structure as one piece or as separate pieces, and for contact to holes and leads. FIG. 3d, shows the cross sectional view of the completed wafer 70 and its layers.

The magnetic head is then constructed over the polysilicon layer using known semiconductor fabrication techniques. One such example of a process for producing a magnetic head is disclosed in U.S. Pat. Nos. 4,837,924, entitled PROCESS FOR THE PRODUCTION OF PLANAR STRUCTURE THIN FILM MAGNETIC HEADS, and 4,949,207, entitled PLANAR STRUCTURE THIN FILM MAGNETIC HEAD, both of which are issued to Jean-Pierre Lazzari and assigned to Commissariat a l'Energie Atomique, and both of which are incorporated herein by reference. For purposes of illustration only, the production of a magnetic head as disclosed by Lazzari will be described. However, those skilled in the art will recognize that other processes for fabricating a magnetic head using semiconductor technology could be used. Further, Lazzari discloses a process for producing a horizontal magnetic head. However, it is to be understood that the present invention is not meant to be limited to an integral suspension and horizontal magnetic head.

Figure 4:
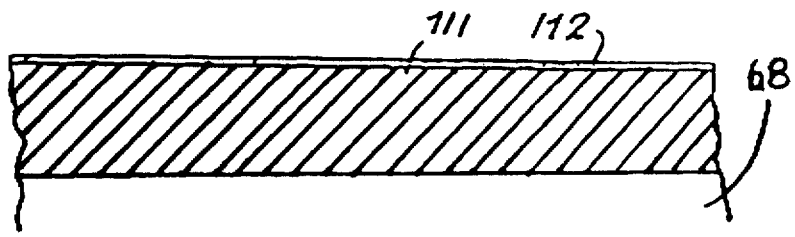
FIGS. 4a–m illustrate one embodiment of a prior art magnetic head fabrication process for an integral head and suspension according to the present invention.
Figure 4:
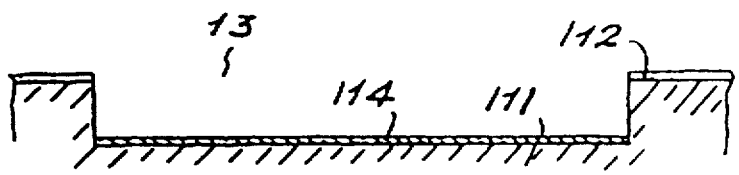
Figure 4:
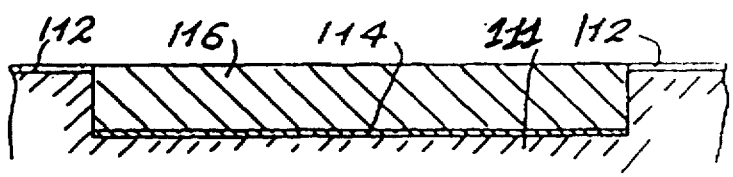
Figure 4:
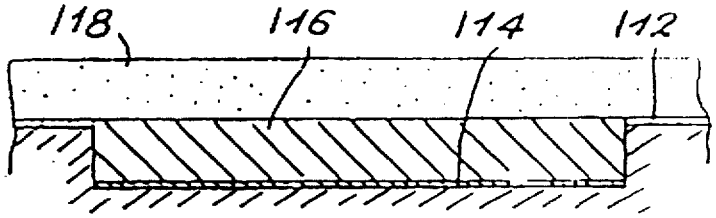
Figure 4:
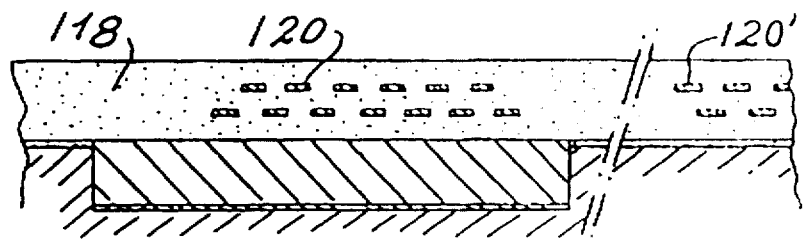
Figure 4:
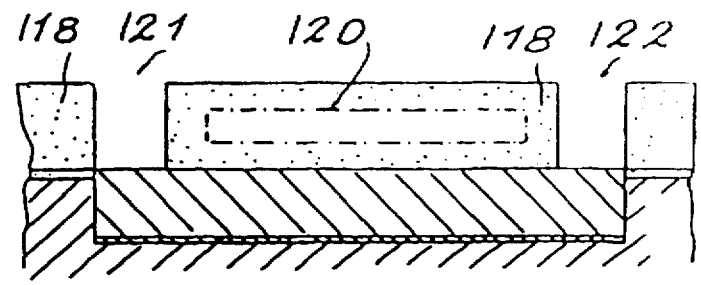
Figure 4:
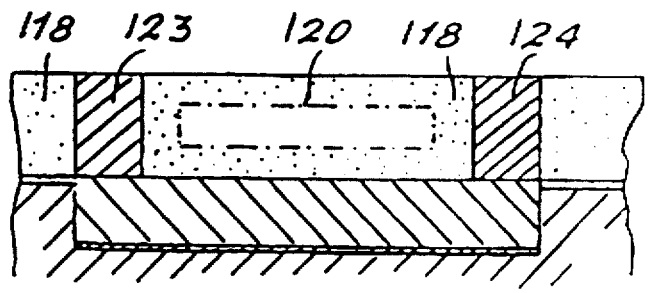
Figure 4:
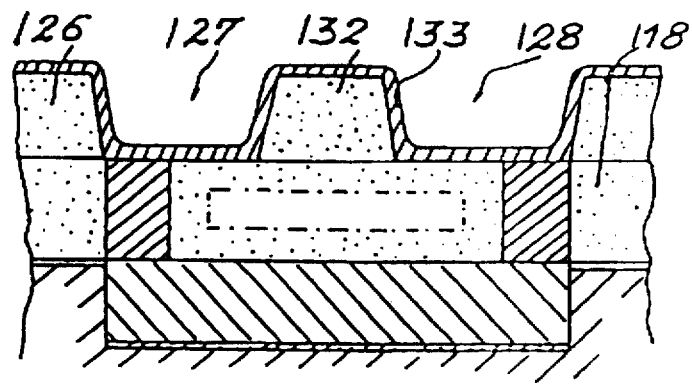
Figure 4:
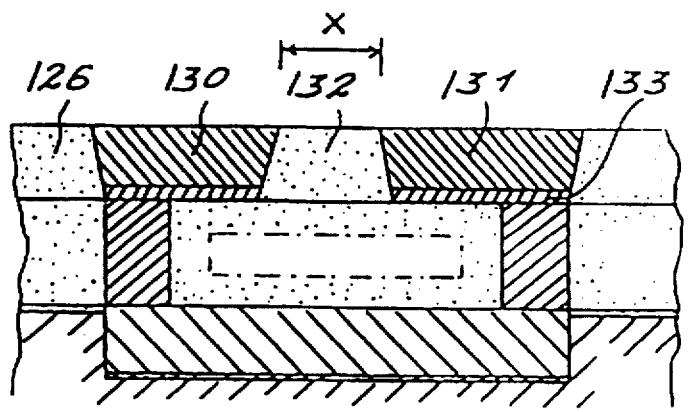
Figure 4:
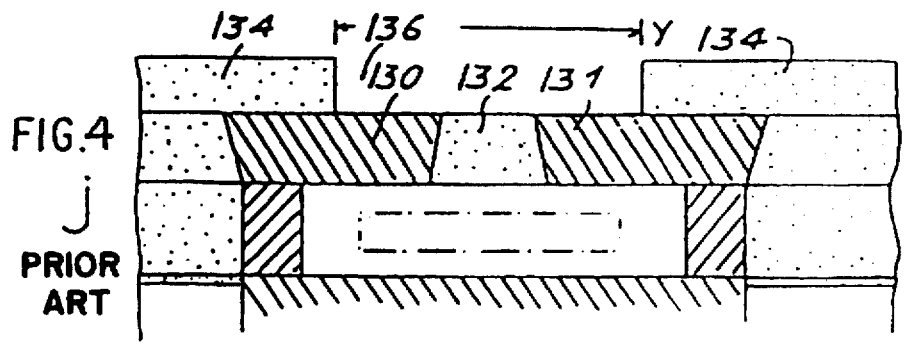
Figure 4:
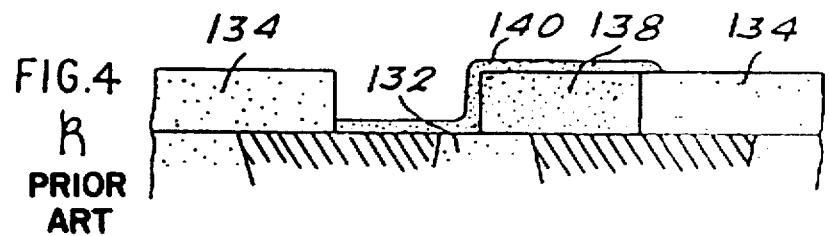
Figure 4:
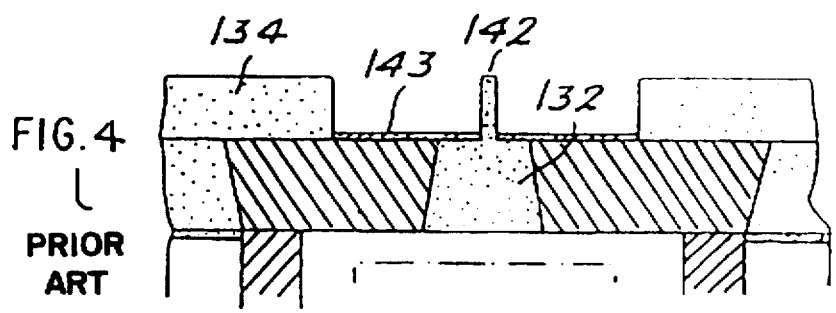
Figure 4:
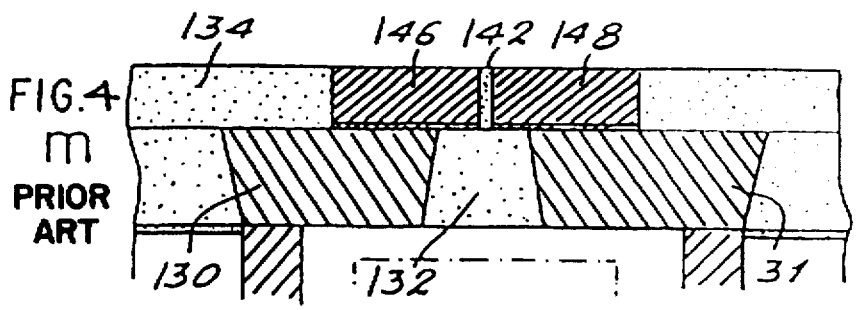

FIG. 4 shows the main stages of the magnetic head fabrication process as disclosed by Lazzari. On the polysilicon layer 68 of FIG. 3d, a silicon dioxide layer 111 is deposited or grown and thereon is formed a first insulating film 112 (e.g. of silicon oxide). In the following figures, only the fabrication of the magnetic head will be illustrated and the polysilicon layer will not be shown.

Insulating film 112 and substrate 111 are etched to form a first recess 113 as shown in FIG. 4b. On the entity is deposited a first conductive film 114, which is then selectively etched in such a way that it only remains at the bottom of the first recess 113. By a first electrolysis using conductive film 114 as the electrode, a first magnetic film 116 is deposited which fills the recess 113, said first magnetic film 116 being level with the surface of the first insulating film 112 as shown in FIG. 4c. Thus, said magnetic film is buried or embedded in the substrate.

FIG. 4d, illustrates a second insulating film 118 being deposited on the entity. In said second insulating film 118 is formed an electric coil 120 which is illustrated in FIG. 4e. This coil is closed by side parts (only one being shown) 120', which are in the same plane as the central part 120. FIG. 4f, shows two openings 121, 122, on either side of the coil 120, being etched in the second insulating film 118 and they reach the first magnetic film 116.

By a second electrolysis using the first conductive film 114 as the electrode, these openings are filled to constitute magnetic contact pads 123, 124, which are in good magnetic continuity with the first magnetic film 116 and are level with the second insulating film 118 as shown in FIG. 4g. On the entity is deposited a third insulating film 126 as shown in FIG. 4h., e.g. of $SiO_2$, $Al_2O_3$, polyimide resin, etc. Second and third recesses 127, 128 are etched in said third insulating film 126 above the magnetic contact pads 123, 124 leaving between the second and third recesses a central insulating island 132 (part h). On the entity is deposited a second conductive film 133, which is then selectively etched so as to only leave it at the bottom of the second and third recesses 127, 128.

FIG. 4i, illustrates a third electrolysis using the second conductive film 133 as the electrode, wherein the second and third recesses are filled by a second magnetic film subdivided into two parts 130, 131 and located on either side of the central insulating island 132, said film being level with the surface of the third insulating film 126. On the entity is deposited a fourth hard protective insulating film 134 as shown in FIG. 4j. In said fourth recess 136 is produced a thin non-magnetic spacer centered on the central insulating island 132. Such a spacer can be obtained in the manner described in the aforementioned European patent application by the deposition of an insulant 138, etching of the latter to give it the shape of a step, deposition of a non-magnetic film 140 as shown in FIG. 4k, etching horizontal portions and maintaining the vertical wall 142 as shown in FIG. 4l. On the entity is deposited a third conductive film 143, which is then selectively etched so as to only leave it at the bottom of the fourth recess 136 on either side of spacer 142.

FIG. 4m, illustrates a fourth electrolysis process using the third conductive film 143 as the electrode, wherein the fourth recess 136 is filled by a third magnetic film subdivided into two parts 146, 148 located on either side of non-magnetic spacer 142, said third magnetic film being level with the surface of the hard protective film 134. There is consequently no need to polish the part as in the prior art.

In this process, the conductive films 114, 133, 143 can e.g. be of copper, chromium or tungsten. The magnetic films 116, 123, 124, 130, 131, 146, 148 can be of Fe:Ni in a ratio of e.g. 80:20 in order to obtain a high magnetic permeability. The thickness of magnetic film 116 can be 1 to 5 μm. The vertical wall 142 can have a width between 0.05 and 1 μm. The width X of the central contact pad 132 may be between 1 and 5 μm. The thickness of hard film 134 can be between 1 and 5 μm. The etching width Y is between 5 and is 15 μm as illustrated in FIG. 4j.

In section, FIG. 5 shows the complete head and suspension obtain by the processed discussed above with reference to FIGS. 3 and 4. The magnetic field lines make it possible to distinguish the concentration of the flux close to the air gap. After the magnetic head is fabricated, the contact hole for the polysilicon is opened for connection to suspension and leads using photoresist and a chemical etchant or reactive ion etching. A trench 190 is created through the silicon wafer by photoresist and a chemical etchant or reactive ion etching is used to define the shape and size of the head and suspension. The head and suspension may be defined as one piece or separate pieces.

Figure 6A:
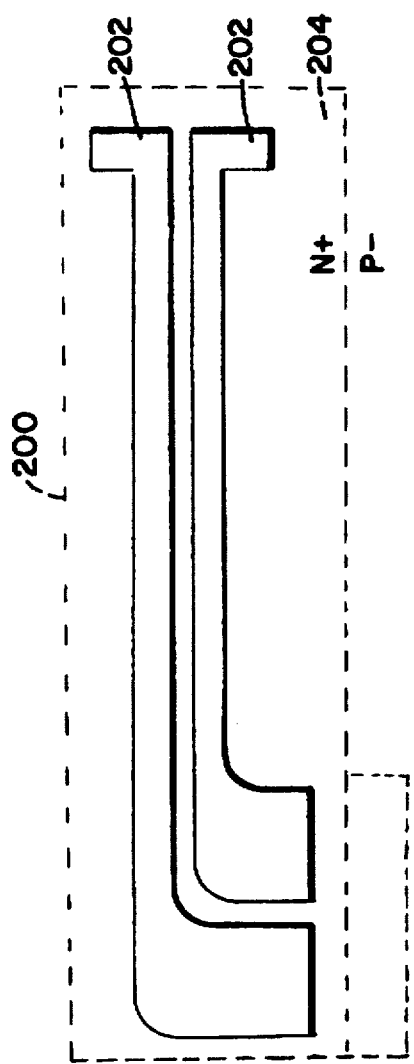
FIG. 6a illustrates the top view of the suspension according to the present invention.
Figure 6B:
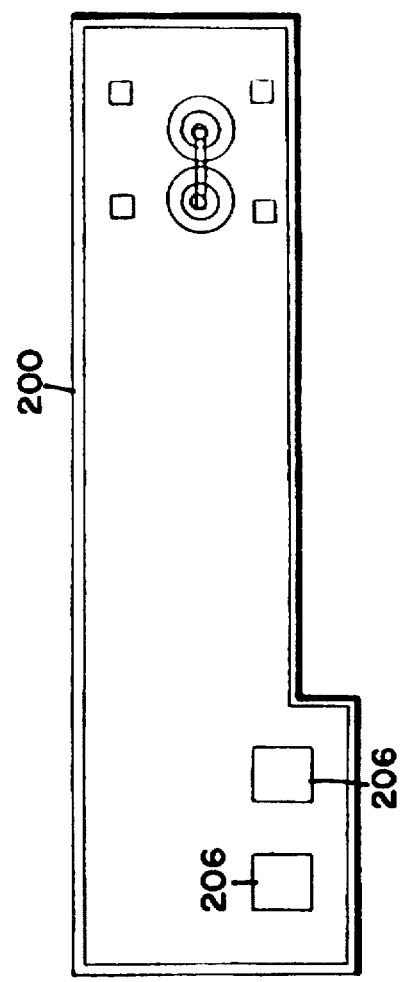
FIG. 6b illustrates the bottom view of the suspension according to the present invention.

FIG. 6a, illustrates the top view of the suspension 200. The leads 202 of polysilicon are shown above the N+ layer 204. FIG. 6b illustrates the bottom view of the suspension 200. In FIG. 6b, the air bearing surface 206 is also visible.

Figure 7:
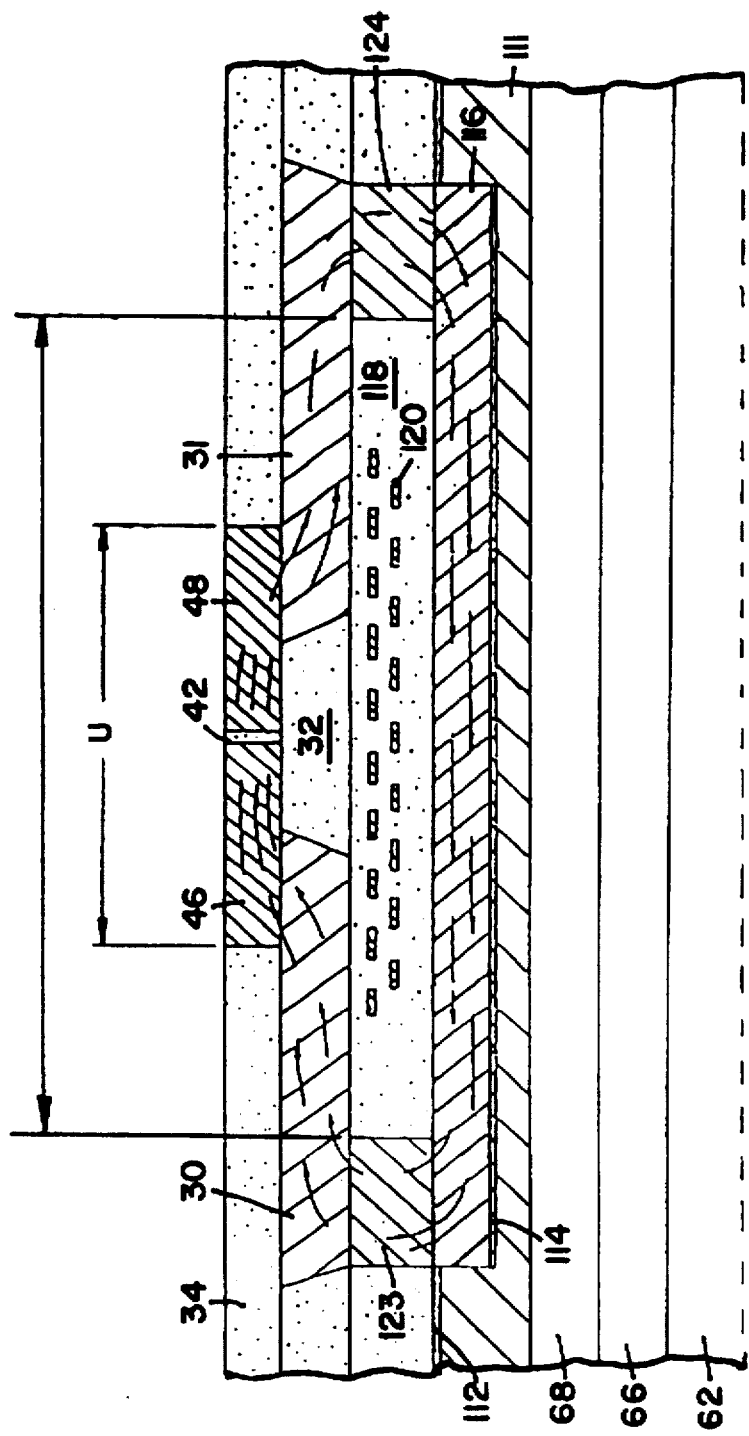
FIG. 7 illustrates the integral head and suspension after removal of the first silicon oxide layer and the P-silicon wafer.

The head is then selectively separated from the wafer by removing the first silicon oxide layer (backside) by a chemical etchant, and the P- silicon wafer by selective etching such as pyrotechatechol (directional etchant) as shown in FIG. 7o This then leaves the N+ silicon layer 62 intact. Finally, the suspended magnetic recording heads may be collected.

Figure 8:
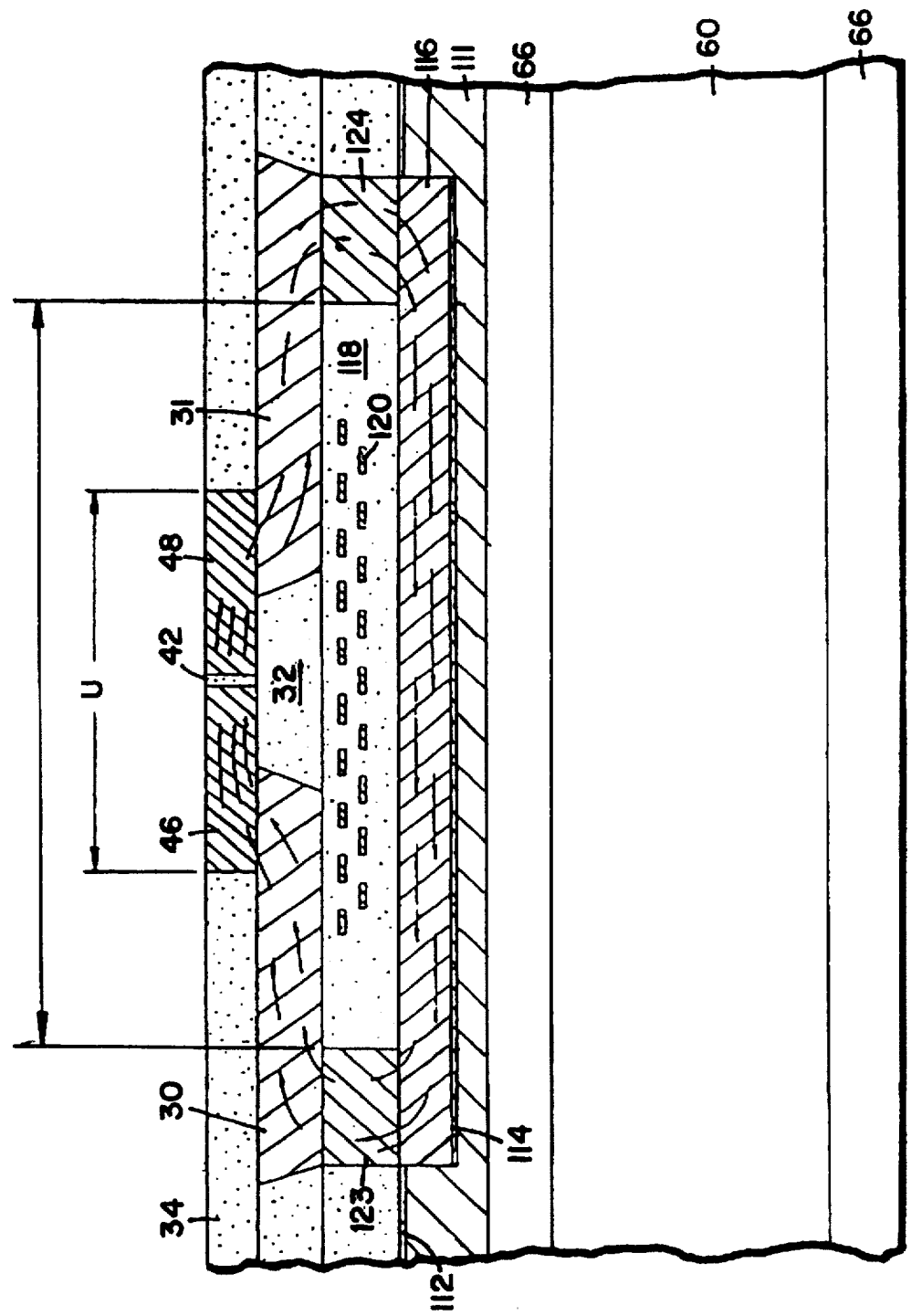
FIG. 8 illustrates a second embodiment of the present invention wherein a low mass magnetic recording head and suspension uses the silicon dioxide matrix for the suspension thereby allowing the elimination of the N+ Si layer and pattern steps.

A second embodiment of the invention, as illustrated in FIG. 8, uses the silicon dioxide matrix for the suspension thereby allowing the elimination of the N+ Si layer and pattern steps. Further options that may be implemented without departing from the invention include using N+ Si as a shield for electrical noise. Polysilicon may also be used to form a resistor 302 (or diode) for ESD protection, and can be placed between the polysilicon pads 206 and pole piece 304 as shown in FIG. 9. Further, multiple leads can be defined for inductive, magnetoresistive or dual head structures. In addition, materials of different thermal expansion coefficients can be deposited on specific locations on the suspension to adjust the gram load of the suspension. Alternatively, grooves may be etched into the suspension to vary the gram load of the suspension.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An integral magnetic head and suspension assembly for a magnetic storage system, comprising:

a P- silicon wafer;

a N+ silicon layer, disposed over the P- silicon wafer, the N+ silicon layer and the P- silicon wafer being thermally oxidized to generate a bottom silicon oxide layer opposite the N+ layer side of the wafer and a top silicon oxide layer on the N+ side of the wafer, the N+ silicon being driven into the P- silicon wafer;

a layer of polysilicon, disposed over the silicon oxide layer over the N+ silicon layer, the polysilicon layer being patterned to define the head structure and suspension structure as one piece and to provide contact to holes and leads; and a magnetic head, disposed on the polysilicon, the magnetic head being separated from the wafer by removing the bottom silicon oxide layer by a chemical etchant, and the P-silicon wafer by selective etching.

2. The magnetic storage system of claim 1 wherein a trench is created through the silicon wafer and the head and suspension are defined by etching.

3. The magnetic storage system of claim 2 wherein the trench is created by photoresist techniques and wherein the head and suspension are defined using a chemical etchant.

4. The magnetic storage system of claim 2 wherein the trench is created by photoresist techniques and wherein the head and suspension are defined using reactive ion etching techniques.

5. The magnetic storage system of claim 1 wherein the P-silicon wafer is removed by a directional etchant.

6. The magnetic storage system of claim 1 wherein the direction etchant is pyrotechatechol.

7. The magnetic storage system of claim 1 wherein the N+ silicon layer is disposed over the P- silicon wafer by ion implantation to produce a doped silicon wafer.

8. The magnetic storage system of claim 7 wherein the N+ dopant is driven into the wafer to the desired thickness of the suspension.

9. The magnetic storage system of claim 1 wherein the N+ silicon layer is disposed over the P- silicon wafer by out-diffusion of a doped glass to produce a doped silicon wafer.

10. The magnetic storage system of claim 7 wherein the N+ dopant is driven into the wafer to the desired thickness of the suspension.

11. The magnetic storage system of claim 1 wherein the polysilicon is doped polysilicon.

12. The magnetic storage system of claim 1 wherein the pattern of polysilicon is patterned by photoresist and a chemical etchant to define head structure and suspension structure as one piece.

13. The magnetic storage system of claim 1 wherein the pattern of polysilicon is patterned by photoresist and reactive ion etching to define head structure and suspension structure as one piece.

14. The magnetic storage system of claim 1 wherein a contact hole for the polysilicon is opened for connection to suspension and leads using photoresist and an etching technique.

15. The magnetic storage system of claim 1 wherein the N+ silicon layer is patterned to shield electrical noise.

16. The magnetic storage system of claim 1 further comprising a material having a selected thermal expansion coefficient deposited or grown on the suspension to form a selected gram load for the suspension.

17. The magnetic storage system of claim 1 further comprising grooves etched into the suspension to vary the gram load of the suspension.

18. The magnetic storage system of claim 1 further comprising a barrier of polysilicon coupled between the leads for electro-static discharge protection.

19. The magnetic storage system of claim 1 wherein the barrier comprises a resistor.

20. The magnetic storage system of claim 1 wherein the barrier a diode.

21. The magnetic storage system of claim 1 wherein the magnetic head further comprises:

a first layer having an insulating substrate, the first layer having a first magnetic film buried therein;

a second insulative layer overlying said first layer, the second insulative layer having an electrical coil located therein for applying an electrical current to induce a magnetic field through them;

a third layer overlying said second insulative layer, the third layer having a central insulating island and two second magnetic film portions in overlying contact with and completely covering said second insulating film; and a fourth layer overlying said third layer, the fourth layer having a central spacer disposed between two magnetic film segments, two magnetic film segments contacting the two magnetic film portions to form a path around the coil, the central spacer comprises a non-magnetic material forming a gap between the two magnetic film portions.

22. A magnetic storage system, comprising:

a housing;

at least one magnetic storage disk disposed within the housing;

a spindle, coupled to the disk, the spindle having an axis of rotation;

a drive means, coupled to the spindle, for rotating the spindle and disk about the axis of rotation;

an actuator, disposed within the housing proximate to the disk;

an integral magnetic head and suspension assembly, coupled to the actuator, the actuator moving the integral magnetic head and suspension assembly relative to the surface of the storage disk, wherein the integral magnetic head and suspension assembly comprises:

a P- silicon wafer;

a N+ silicon layer, disposed over the P- silicon wafer, the N+ silicon layer and the P- silicon wafer being thermally oxidized to generate a bottom silicon oxide layer opposite the N+ layer side of the wafer and a top silicon oxide layer on the N+ side of the wafer, the N+ silicon being driven into the P- silicon wafer;

a layer of polysilicon, disposed over the top silicon oxide layer, the polysilicon layer being patterned to define the head structure and suspension structure as one piece and to provide contact to holes and leads; and a magnetic head, disposed on the polysilicon, the magnetic head being separated from the wafer by removing the bottom silicon oxide layer by a chemical etchant, and the P-silicon wafer by selective etching.

23. The magnetic storage system of claim 22 wherein a trench is created through the silicon wafer and the head and suspension are defined by etching.

24. The magnetic storage system of claim 23 wherein the trench is created by photoresist techniques and wherein the head and suspension are defined using a chemical etchant.

25. The magnetic storage system of claim 23 wherein the trench is created by photoresist techniques and wherein the head and suspension are defined using reactive ion etching techniques.

26. The magnetic storage system of claim 22 wherein the P- silicon wafer is removed by a directional etchant.

27. The magnetic storage system of claim 22 wherein the direction etchant is pyrotechatechol.

28. The magnetic storage system of claim 22 wherein the N+ silicon layer is disposed over the P- silicon wafer by ion implantation to produce a doped silicon wafer.

29. The magnetic storage system of claim 28 wherein the N+ dopant is driven into the wafer to the desired thickness of the suspension.

30. The magnetic storage system of claim 22 wherein the N+ silicon layer is disposed over the P- silicon wafer by out-diffusion of a doped glass to produce a doped silicon wafer.

31. The magnetic storage system of claim 30 wherein the N+ dopant is driven into the wafer to the desired thickness of the suspension.

32. The magnetic storage system of claim 22 wherein the polysilicon is doped polysilicon.

33. The magnetic storage system of claim 22 wherein the pattern of polysilicon is patterned by photoresist and a chemical etchant to define head structure and suspension structure as one piece.

34. The magnetic storage system of claim 22 wherein the pattern of polysilicon is patterned by photoresist and reactive ion etching to define head structure and suspension structure as one piece.

35. The magnetic storage system of claim 22 wherein a contact hole for the polysilicon is opened for connection to suspension and leads using photoresist and an etching technique.

36. The magnetic storage system of claim 22 wherein the N+ silicon layer is patterned to shield electrical noise.

37. The magnetic storage system of claim 22 further comprising a material having a selected thermal expansion coefficient deposited or grown on the suspension to form a selected gram load for the suspension.

38. The magnetic storage system of claim 22 further comprising grooves etched into the suspension to vary the gram load of the suspension.

39. The magnetic storage system of claim 22 further comprising a barrier of polysilicon coupled between the leads for electro-static discharge protection.

40. The magnetic storage system of claim 22 wherein the barrier comprises a resistor.

41. The magnetic storage system of claim 22 wherein the barrier comprises a diode.

42. The magnetic storage system of claim 22 wherein the magnetic head further comprises:

(i) a first layer having; an insulating substrate having a top surface and a first magnetic film buried in the substrate from the top surface thereof such that an exposed surface of the magnetic film is level with the top surface of the substrate;

(ii) a second layer overlying said first layer having; a second insulating film in overlying contact with the exposed surface of said first magnetic film and leaving said first magnetic film exposed at each end of the second insulating film, said second insulating film having an electrical coil located therein and two magnetic contact pads in overlying contact with the exposed surface of the first magnetic film at the ends of the second insulating film and in contact with second insulating film;

(iii) a third layer overlying said second layer and having; a central insulating island and two second magnetic film portions in overlying contact with and completely covering said second insulating film and said contact pads such that said central insulating island is in contact with the second insulating film at a central portion thereof thereby leaving the surface of the second insulating film on either side of the insulating island uncovered and each of said second magnetic film portions in overlying contact with a respective one of the uncovered surfaces of the second insulating film and a contact pad contiguous to that uncovered portion of the second insulating film; and (iv) a fourth layer overlying said third layer and having; a third magnetic film, subdivided and separated into two parts by an non-magnetic spacer, in overlying contact with said insulating island, said two parts each overlying and contacting a respective one of said second magnetic film portions, and a hard protective insulating film in contact with the subdivided third magnetic film and covering all portions of the third layer not covered by said subdivided third magnetic film and said non-magnetic spacer.

43. A magnetic storage system, comprising:

a housing at least one magnetic storage disk a spindle for mounting the magnetic storage disk a drive means coupled to a spindle for rotating the disk an actuator, coupled to the housing, an integral magnetic head and suspension assembly, coupled to the actuator, the actuator moving the integral magnetic head and suspension assembly across the surface of the storage disk, wherein the integral magnetic head and suspension assembly comprises:

a P- silicon wafer, the P- silicon wafer being thermally oxidized to generate a first and second silicon oxide layer on opposite sides of the silicon wafer, the silicon oxide forming a suspension piece; and a magnetic head, disposed on the second silicon oxide layer, the magnetic head being separated from the wafer by removing the first silicon oxide layer by a chemical etchant, and the P- silicon wafer by selective etching.

44. The magnetic storage system of claim 43 wherein a trench is created through the silicon wafer and the head and suspension are defined by etching.

45. The magnetic storage system of claim 44 wherein the trench is created by photoresist techniques and wherein the head and suspension are defined using a chemical etchant.

46. The magnetic storage system of claim 44 wherein the trench is created by photoresist techniques and wherein the head and suspension are defined using reactive ion etching techniques.

47. The magnetic storage system of claim 43 wherein the P- silicon wafer is removed by a directional etchant.

48. The magnetic storage system of claim 43 wherein the direction etchant is pyrotechatechol.

49. The magnetic storage system of claim 43 wherein the pattern of polysilicon is patterned by photoresist and a chemical etchant to define head structure and suspension structure as one piece.

50. The magnetic storage system of claim 43 wherein the pattern of polysilicon is patterned by photoresist and reactive ion etching to define head structure and suspension structure as one piece.

51. The magnetic storage system of claim 43 wherein a contact hole for the polysilicon is opened for connection to suspension and leads using photoresist and an etching technique.

52. The magnetic storage system of claim 43 further comprising a material having a selected thermal expansion coefficient deposited or grown on the suspension to form a selected gram load for the suspension.

53. The magnetic storage system of claim 43 further comprising grooves etched into the suspension to vary the gram load of the suspension.

54. The magnetic storage system of claim 43 wherein the magnetic head further comprises:

(i) a first layer having; an insulating substrate having a top surface and a first magnetic film buried in the substrate from the top surface thereof such that an exposed surface of the magnetic film is level with the top surface of the substrate;

(ii) a second layer overlying said first layer having; a second insulating film in overlying contact with the exposed surface of said first magnetic film and leaving said first magnetic film exposed at each end of the second insulating film, said second insulating film having an electrical coil located therein and two magnetic contact pads in overlying contact with the exposed surface of the first magnetic film at the ends of the second insulating film and in contact with second insulating film;

(iii) a third layer overlying said second layer and having; a central insulating island and two second magnetic film portions in overlying contact with and completely covering said second insulating film and said contact pads such that said central insulating island is in contact with the second insulating film at a central portion thereof thereby leaving the surface of the second insulating film on either side of the insulating island uncovered and each of said second magnetic film portions in overlying contact with a respective one of the uncovered surfaces of the second insulating film and a contact pad contiguous to that uncovered portion of the second insulating film; and (iv) a fourth layer overlying said third layer and having; a third magnetic film, subdivided and separated into two parts by an non-magnetic spacer, in overlying contact with said insulating island, said two parts each overlying and contacting a respective one of said second magnetic film portions, and a hard protective insulating film in contact with the subdivided third magnetic film and covering all portions of the third layer not covered by said subdivided third magnetic film and said non-magnetic spacer.

55. The magnetic storage system of claim 43 wherein the suspension is conductive to allow grounding of the suspension.

* * * * *